(12) United States Patent  (10) Patent No.: US 7,435,078 B2
Gaillard et al.  (45) Date of Patent: Oct. 14, 2008

(54) NOZZLE SLEEVE FOR AN INJECTION MOLDING APPARATUS

(75) Inventors: Patrice Fabien Gaillard, Milton, VT (US); Abdeslam Bouti, Swanton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 205 days.

(21) Appl. No.: 11/565,205

(22) Filed: Nov. 30, 2006

(65) Prior Publication Data

US 2008/0131552 A1 Jun. 5, 2008

(51) Int. Cl.
B29C 45/20 (2006.01)
(52) U.S. Cl. ...................................... 425/549; 425/568
(58) Field of Classification Search ................ 425/549, 425/562, 563, 564, 565, 566, 568
See application file for complete search history.

(56) References Cited

U.S. PATENT DOCUMENTS

| | | | |
|---|---|---|---|
| 3,934,626 A * | 1/1976 | Hall ............................ | 425/568 |
| 4,921,416 A | 5/1990 | Green | |
| 5,162,125 A * | 11/1992 | Akselrud et al. ............ | 425/562 |
| 5,208,052 A | 5/1993 | Schmidt et al. | |
| 5,360,333 A * | 11/1994 | Schmidt ...................... | 425/549 |
| 5,554,395 A | 9/1996 | Hume et al. | |
| 5,811,140 A * | 9/1998 | Manner ....................... | 425/564 |
| 5,820,803 A * | 10/1998 | Hashimoto ................... | 425/566 |
| 6,506,045 B2 * | 1/2003 | Corocher et al. ............ | 425/549 |
| 7,168,941 B2 * | 1/2007 | Babin et al. ................. | 425/549 |
| 2004/0191355 A1 | 9/2004 | Babin et al. | |

FOREIGN PATENT DOCUMENTS

CA 2537831 A1 3/2005
EP 1602465 A1 12/2005

* cited by examiner

Primary Examiner—Tim Heitbrink

(57) ABSTRACT

An injection molding apparatus that includes a hot runner and a mold. The hot runner includes at least one nozzle that engages a nozzle-receiving cavity of the mold. The molding apparatus further includes a nozzle sleeve surrounding a portion of the nozzle and having a nozzle-sealing opening that receives the nozzle. The nozzle sleeve is movably secured to the hot runner or the mold so that when the mold is removed from the hot runner, the nozzle sleeve remains secured to the corresponding part of the apparatus. When the mold and hot runner are engaged with one another, the nozzle sleeve is springingly urged into sealing engagement with a sealing surface of the nozzle receiving cavity of the mold.

9 Claims, 3 Drawing Sheets

NOZZLE SLEEVE FOR AN INJECTION MOLDING APPARATUS

FIELD OF THE INVENTION

The present disclosure generally relates to the field of injection molding. In particular, the present disclosure is directed to a nozzle sleeve for an injection molding apparatus.

DESCRIPTION OF THE RELATED ART

Injection molding of items made of plastic and other molding materials often utilizes a multi-nozzle hot-runner assembly that removably engages a corresponding mold assembly to distribute the molding material either to differing locations of a single mold cavity or to differing mold cavities, depending on the item(s) being molded. Such a hot-runner assembly typically includes a manifold that distributes the molding material to multiple nozzles that deliver the molding material to the mold. Each nozzle typically extends from the manifold into a nozzle-receiving cavity of the mold assembly that, in turn, is in fluid communication with the corresponding mold cavity. In order to inhibit molding material from flowing around the nozzles and out of the nozzle-receiving cavities of the mold assemblies, a sealing arrangement is provided between each nozzle and the nozzle-receiving cavity.

Two typical sealing arrangements for inhibiting the molding material from flowing out of the nozzle-receiving cavities utilize thermal expansion of the nozzles and the mold assembly to create a compression seal between each nozzle and the sidewall of the corresponding respective nozzle-receiving cavity. In one of these arrangements the compression seal is formed between the tip of the nozzle and the sidewall of the nozzle-receiving cavity, and in the other arrangement the compression seal is formed between the housing of the nozzle and the sidewall of the nozzle-receiving cavity. When the hot runner and mold assemblies are at room temperature, the nozzles and nozzle-receiving cavities are sized to allow the nozzles to move freely, though with relatively tight clearances between the sealing surfaces, within the nozzle-receiving cavities. As the assemblies are preheated for use, the thermal expansion of the nozzles and mold assemblies causes the sealing surfaces to contact one another and then press against one another to form a tight seal.

While these sealing arrangements function very well when the sealing surfaces are properly finished, unworn and undamaged, their effectiveness can be significantly diminished when either or both of the sealing surfaces become worn or damaged, e.g., from scratches, gouges, indentations, etc. Wearing/damaging of the sealing surfaces does not typically occur when the mold assembly is engaged or disengaged with the hot runner assembly at room temperature. However, the sealing surfaces can, and often do, become worn/damaged when the mold assembly is disengaged from and/or engage with the hot runner assembly when the assemblies are hot and, therefore, when the sealing surfaces are in tight contact with each other or the outside diameter of the nozzle tip or housing is slightly larger than the inside diameter of the portion of the nozzle-receiving cavity at which the seal is normally formed. Reasons for disengaging and reengaging the mold assembly while the assemblies are still hot include changing the mold assembly, removing un-melted blockage and removing a color bubble when changing the color of the molding material.

SUMMARY OF THE DISCLOSURE

In one aspect, the present disclosure is directed to an injection molding assembly. The injection molding assembly comprises a hot runner that includes an injection nozzle comprising a tip and having an outer periphery. A mold is secured to the hot runner and includes a mold cavity and a nozzle-receiving cavity in fluid communication with the mold cavity and receiving a portion of the injection nozzle. The nozzle-receiving cavity includes a sealing surface and a tip region receiving the tip of the injection nozzle. A nozzle sleeve surrounds the outer periphery of at least a portion of the injection nozzle and is secured to the injection molding assembly independently of the injection nozzle. The nozzle sleeve includes a nozzle sealing opening receiving a portion of the injection nozzle therethrough and is configured to form a seal with the injection nozzle at least when the injection nozzle and the nozzle sleeve are at an operating temperature. The nozzle sleeve is springingly urged between the hot runner and the sealing surface so as to seal the tip region relative to the nozzle-receiving cavity.

In another embodiment, the present disclosure is directed to a nozzle sleeve for surrounding a portion of an injection nozzle of a hot runner and extending at least partially into a nozzle-receiving cavity of a mold when the mold is engaged with the hot runner, wherein one of 1) the hot runner and 2) the mold includes a retainer for movingly retaining the nozzle sleeve. The nozzle sleeve comprises a body having a longitudinal central axis and includes a nozzle-sealing opening for sealingly engaging the injection nozzle during molding. The body also includes a cavity-sealing region for sealingly engaging the nozzle-receiving cavity of the mold during molding. The body further includes a stop configured for engaging the retainer when the mold is disengaged from the hot runner and when the nozzle sleeve is secured to the one of 1) the hot runner and 2) the mold. The stop is also configured for being spaced from the retainer during molding.

In a further embodiment, the present disclosure is directed to a hot runner for use with a mold having a nozzle-sleeve receiver. The hot runner comprises a mold-confronting face for confronting the mold and at least one nozzle proximate the mold-confronting face for delivering a molding material to the mold. A nozzle sleeve surrounds at least a portion of the at least one nozzle and includes a nozzle-sealing opening receiving the at least one nozzle. The hot runner further comprises a nozzle-sleeve retainer movably securing the nozzle sleeve to the hot runner. The nozzle sleeve is springingly biased into engagement with the nozzle-sleeve retainer when the mold is distal from the hot runner, and the nozzle sleeve is springingly biased into sealing engagement with the nozzle-sleeve receiver when the mold is properly engaged with the hot runner.

In yet another embodiment, the present disclosure is directed to an injection mold for use with a hot runner that has a mold-confronting face and includes at least one nozzle proximate the mold-confronting face. The injection mold comprises and nozzle-sleeve receiver and a nozzle sleeve including a nozzle-sealing opening for receiving the at least one nozzle when the hot runner is properly engaged with the injection mold. The injection mold also comprises a nozzle-sleeve retainer movably securing the nozzle sleeve to the injection mold. The nozzle sleeve is springingly biased into engagement with the nozzle-sleeve retainer when the injection mold is distal from the hot runner, and the nozzle sleeve is springingly biased into sealing engagement with the nozzle-sleeve receiver when the mold is properly engaged with the hot runner.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
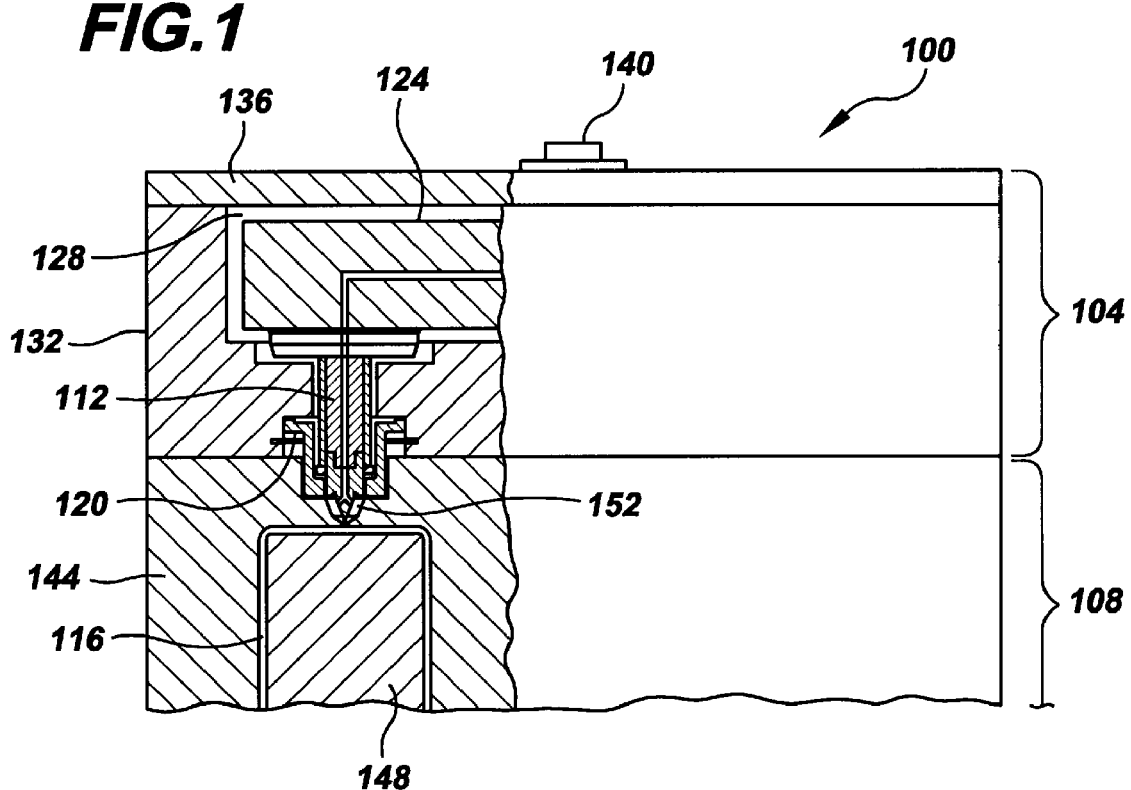
FIG. 1 is a partial cross-sectional view/partial elevational view of a molding apparatus made in accordance with the present invention.

Referring now to the drawings, FIG. 1 illustrates a molding apparatus 100 made in accordance with the present invention. As those skilled in the art will readily appreciate, molding apparatus 100 may be adapted for any sort of injection molding process, including plastic injection molding processes, metal injection molding processes and composite injection molding processes, e.g., molding processes that utilize filler materials co-injected with a binder, among others. At a high level, molding apparatus 100 includes a hot runner 104 and a mold 108 engaged with the hot runner. Hot runner 104 includes at least one injection nozzle 112 that injects the relevant flowable material (not shown), e.g., molten plastic, molten metal, molten binder/filler mixture, etc., into one or more mold cavities 116 formed within mold 108.

As discussed in the background section above, a problem that can arise during use of certain molding apparatuses is that the nozzle can be damaged by the mold, particularly when the mold is disengaged from the hot runner when the apparatus has not sufficiently cooled. Molding apparatus 100, however, includes a unique nozzle sleeve 120 for each injection nozzle 112 that substantially mitigates this problem. As discussed below in connection with FIGS. 2 and 3, each nozzle sleeve 120 inhibits the corresponding injection nozzle 112 from being damaged when mold 108 is removed from hot runner 104 even when molding apparatus 100 is hot by providing an intermediate structure between the injection nozzle and the mold so that the injection nozzle is never in direct contact with the mold. Since there is never direct contact between each nozzle 112 and mold 108 at any point during molding and when engaging or disengaging the mold from hot runner 104, there is essentially no opportunity for the mold to damage that injection nozzle. Prior to describing nozzle sleeve 120 and several variants thereof in detail, other components of molding assembly 100 will first be described.

Each injection nozzle 112 may be of any gate type, such as a valve-gate type (not shown) or the thermal-gate type shown. In addition to the at least one injection nozzle 112, hot runner 104 may include a manifold 124 that delivers the molding material (not shown) to each of the nozzles. In accordance with conventional hot runner design, manifold 124 may be located within a manifold cavity 128, which may be formed within a manifold plate 132 as shown, or alternatively may be formed within a built-up structure, e.g., a "front" plate (not shown) that would confront mold 108 and one or more side closures (not shown) that would enclose the lateral sides of manifold 124. Those skilled in the art will understand the variety of ways to support a hot-runner manifold, such as manifold 120, such that each of these ways need not be described or illustrated for those skilled in the art to appreciate the broad applicability of the present disclosure. Hot runner 104 may also include a backing plate 136 that, among other things, closes manifold cavity 128. An inlet 140 may also be provided for mating with an injection machine (not shown) that forces a molding material through passageways within manifold 124 and each injection nozzle 112. Fasteners and other components of hot runner 104, such as manifold heaters, cooling channels, etc., are not shown for convenience.

Mold 108 may include, among other things, a cavity plate 144 and at least one insert 148 that define the one or more mold cavities 116 that define the part(s) to be molded. Mold 108 may be secured to hot runner 104 using any suitable means (not shown) such as fasteners. Other parts that mold 108 may include, such as an insert plate, ejector components for ejecting the molded part(s) from the mold, alignment pins, cooling channels, etc., are not shown for convenience. Of course, those skilled in the art will readily understand how these and other components may be implemented in mold 108 or any other mold compatible with the present invention. In this example and as discussed in more detail below relative to FIG. 2, cavity plate 144 may include a nozzle-receiving cavity 152 that receives a corresponding injection nozzle of hot runner 104, as well as receives the corresponding nozzle sleeve 120. Those skilled in the art will readily appreciate that hot runner 104 and mold 108 shown and described and the alternative embodiments thereof described above are merely exemplary and should not be construed as limiting the scope of the present invention.

Figure 2:
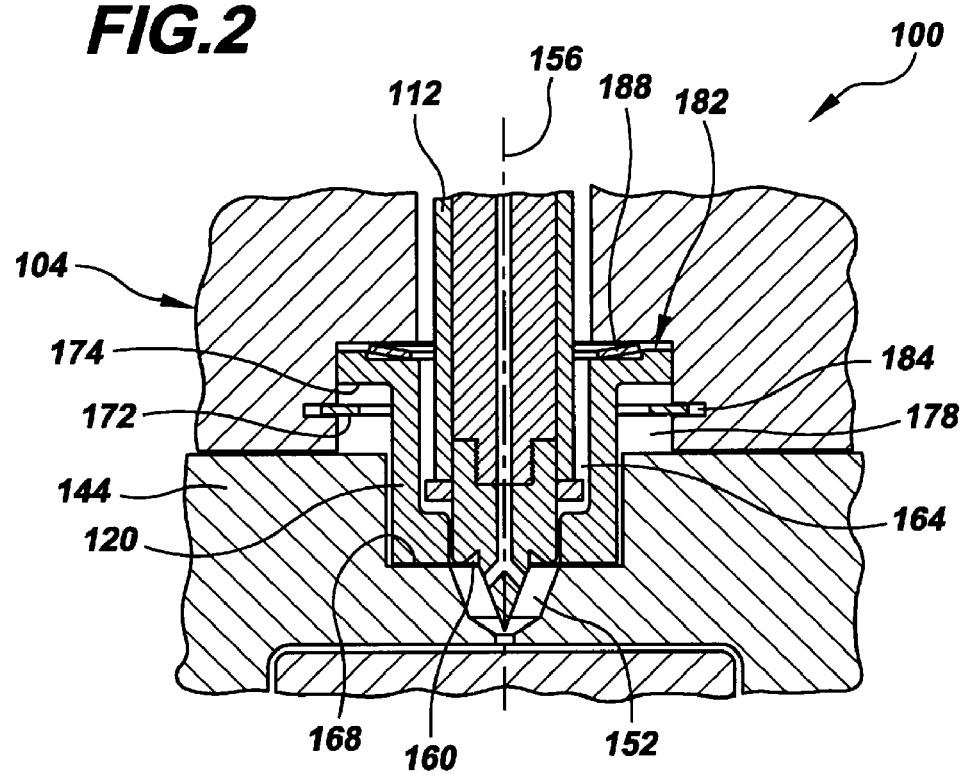
FIG. 2 is an enlarged partial cross-sectional view of the molding apparatus of FIG. 1 showing one of the nozzle sleeves compressed between the hot runner and mold portions of the apparatus during use thereof.
Figure 3:
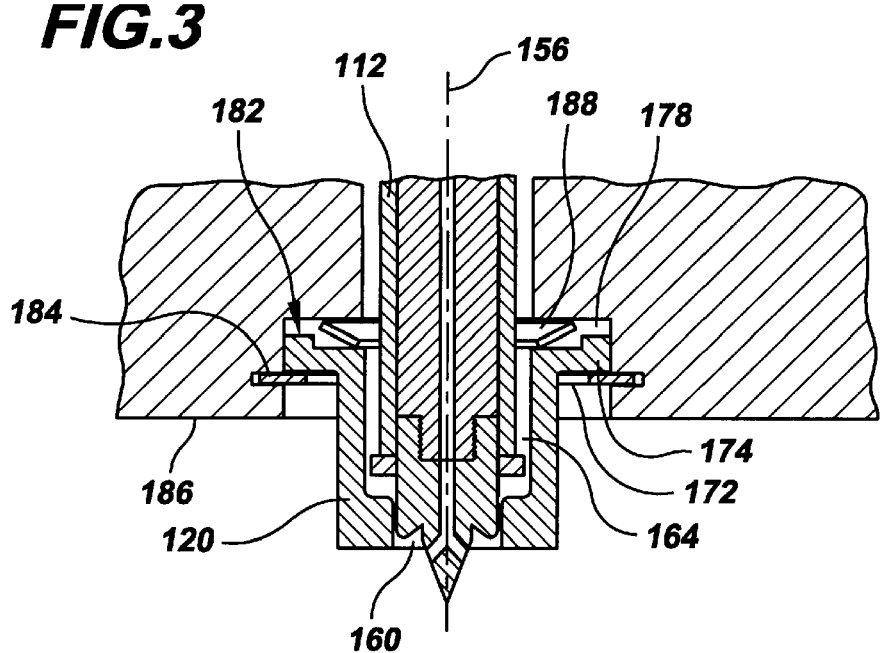
FIG. 3 is an enlarged partial cross-sectional view of the hot runner of the molding apparatus of FIG. 1 showing the nozzle sleeve of FIG. 2 when the mold is removed from the hot runner.

FIGS. 2 and 3 more particularly illustrate the arrangement of nozzle sleeve 120 within molding apparatus 100 of FIG. 1. Referring to FIGS. 2 and 3, nozzle sleeve 120 is generally tubular in shape along the central longitudinal axis 156 of injection nozzle 112 so as to surround a portion of the nozzle. Nozzle sleeve 120 includes a nozzle sealing opening 160 configured to form a tight seal with injection nozzle 112 at least when mold assembly is at operating temperature. This seal may be referred to as the "nozzle seal." In the embodiment shown, the nozzle seal provided by sealing opening 160 is effected by a tight fit between the sides of the opening and injection nozzle 112 caused by thermal expansion of the parts during their heating to operating temperature. In alternative embodiments, the nozzle seal may be provided by other means, such as an O-ring (not shown) made of a suitable material or an interference fit between a flexible portion (not shown) of nozzle sleeve 120 that contacts injection nozzle 112 entirely around its outer periphery and flexes so as to create the nozzle seal (see, e.g., FIGS. 5 and 6, wherein integral spring 524 creates such a seal with nozzle 544). In whatever manner the nozzle seal is formed between nozzle sleeve 120 and injection nozzle 112, it must be sufficient to inhibit the flow of molding material (not shown) into the space 164 between injection nozzle 112 and nozzle sleeve 120 beyond the nozzle seal.

As best seen by comparing FIG. 3 to FIG. 2, nozzle sleeve 120 is spring loaded so as to be movable between a disengaged position (FIG. 3), wherein the sleeve remains with hot runner 104 when mold 108 is removed, and an engaged position (FIG. 2), wherein the sleeve is urged against a sealing surface 168 of nozzle-receiving cavity 152 so as to create an effective cavity seal between the sleeve and cavity plate 144. To accommodate this movable configuration, nozzle sleeve 120 may be movably secured to hot runner 104, e.g., by providing the hot runner with a retainer 172 that is engageable with one or more corresponding stops 174 on the sleeve. In the embodiment shown, hot runner 104 is provided with a sleeve cavity 178 that slidably receives a flanged portion 182 of nozzle sleeve 120. Correspondingly, with flanged portion 182 containing stop 174, retainer 172 may be the retainer ring shown that engages a corresponding groove 184 in the wall of sleeve cavity 178. In alternative embodiments, retainer 172 and stop 174 may be other structures.

For example, if hot runner 104 is provided with a sleeve cavity similar to sleeve cavity 178 and nozzle sleeve 120 has a flanged portion similar to flanged portion 182, the retainer may be an annular plate (not shown) fastened to the front face 186 (FIG. 3) of the hot runner. In its disengaged position (similar to FIG. 3), the one or more stops 174 on the flanged portion could be spring-urged into engagement with the annular plate. In yet other alternative embodiments wherein no sleeve cavity is provided to hot runner 104, but nozzle sleeve 120 has a flanged portion similar to flanged portion 182, the retainer may be a generally cup-shaped escutcheon (not shown) secured to front face 186 of hot runner 104 that has a central opening smaller than the outside diameter of the flanged portion but large enough to allow the rest of the nozzle sleeve to extend therethrough. In its disengaged position (similar to FIG. 3), the one or more stops 174 on the flanged portion could be spring-urged into engagement with the escutcheon. Those skilled in the art will readily appreciate the wide variety of structures that can be used for retainer 172 and stop(s) 174.

Figure 4:
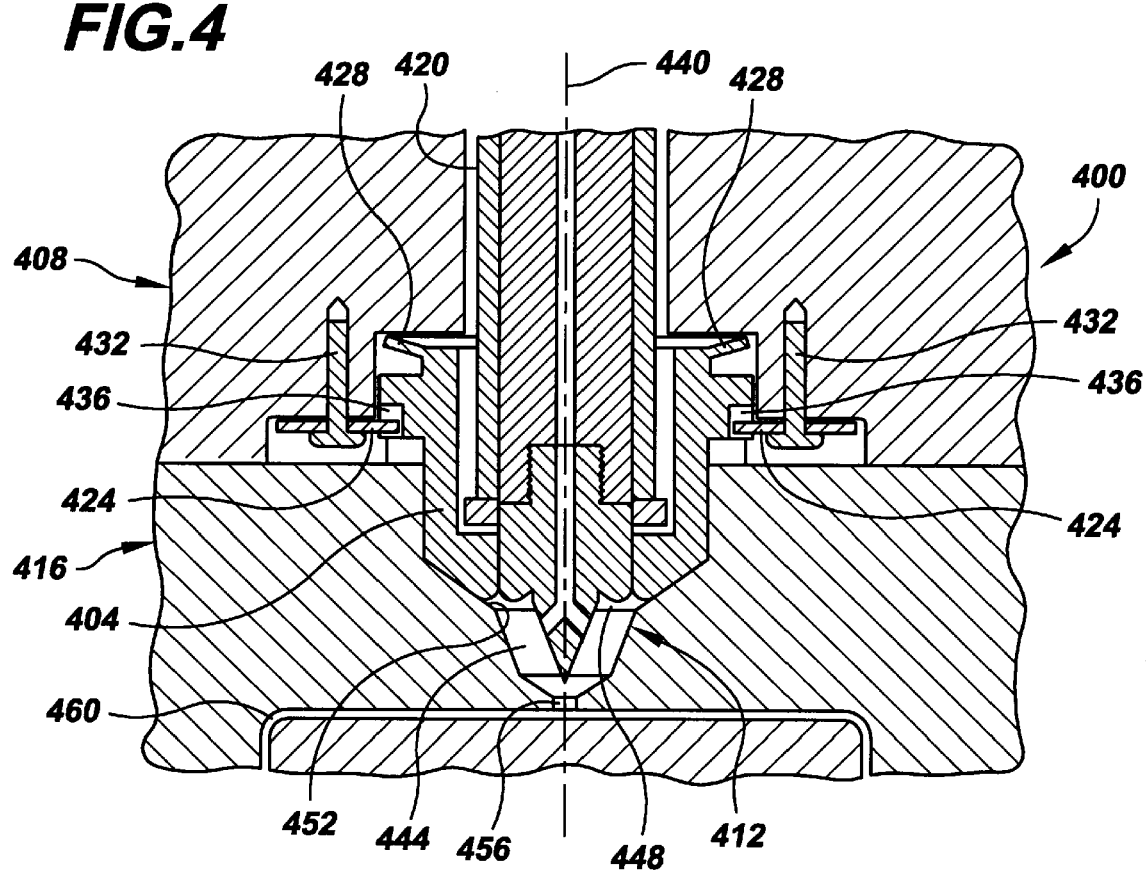
FIG. 4 is a partial cross-sectional view of an alternative molding apparatus made in accordance with the present invention showing a nozzle sleeve secured to a hot-runner portion of the apparatus and compressed between the hot-runner portion and a mold portion of the apparatus during use thereof.
Figure 5:
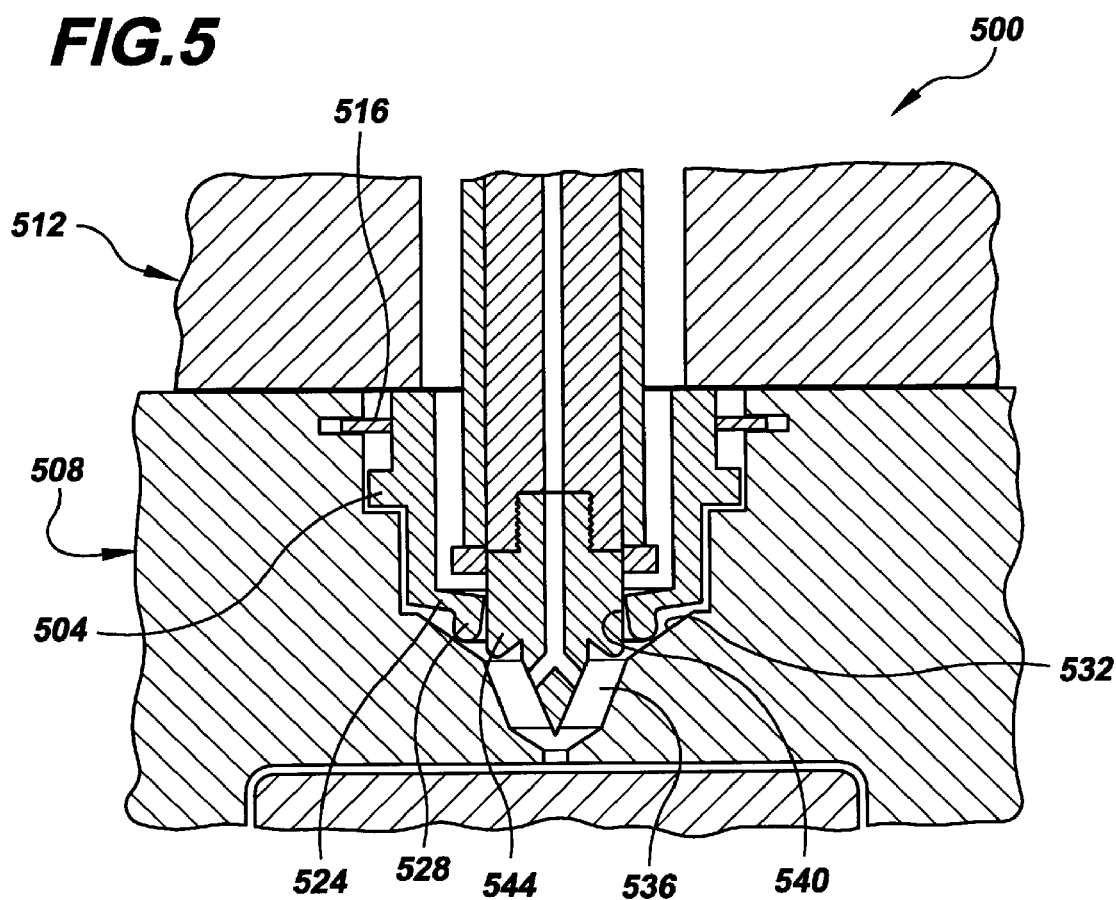
FIG. 5 is a partial cross-sectional view of yet another alternative molding apparatus made in accordance with the present invention showing a nozzle sleeve secured to a mold portion of the apparatus and compressed between a hot-runner portion and the mold portion of the apparatus during use thereof.
Figure 6:
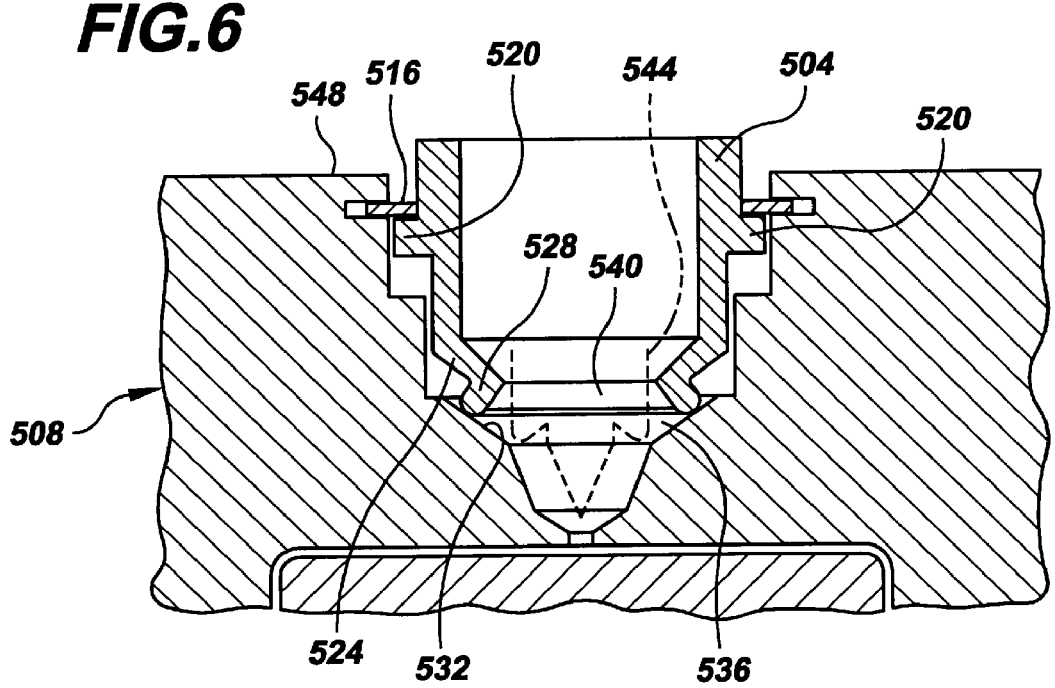
FIG. 6 is a partial cross-sectional view of the mold portion of the molding apparatus of FIG. 5 showing the nozzle sleeve when the mold portion is not engaged to the hot runner portion.

Nozzle sleeve 120 may be spring-loaded using any of a variety of urging means 188, such as the Belleville washer shown. Other urging means include, but are not limited to, coil springs, leaf springs, torsion springs, bellows springs, cantilever springs, resilient masses, and combinations thereof. Urging means 188 may be formed separately from nozzle sleeve 120 or integrally therewith. Regarding the latter, FIG. 4 shows an integrally formed urging mean 428 for a nozzle sleeve 404 movably secured to a hot runner 408. FIGS. 5 and 6 show an integrally formed urging means 524 for a nozzle sleeve 504 movably secured to a mold 508. Those skilled in the art will readily recognize how to implement the urging means selected for a particular application. Referring again to FIGS. 2 and 3, the urging power of urging means 188 may be selected so that the urging means can move nozzle sleeve 120 against the friction of the nozzle seal when at operating temperature or below or, alternatively, at or below another temperature lower than the operating temperature, depending upon the criteria for a particular design. Nozzle sleeve 120 may be made of any suitable material such as 420SS, H13, etc. Of course, other materials may be used.

FIG. 4 illustrates an alternative molding apparatus 400 that includes at least one nozzle sleeve 404 movably secured to a hot runner 408 and inserted into a nozzle-receiving cavity 412 of a mold 416. Nozzle sleeve 404 is similar to nozzle sleeve 120 of FIGS. 1-3 in terms of its being secured to hot runner 408, its sealing relationship to nozzle 420 and its being spring-loaded into sealing engagement with mold 416 when the mold is secured to the hot runner and into engagement with retainers 424 when the mold is not present. That said, nozzle sleeve 404, hot runner 408 and mold 416 have some differences relative to the corresponding respective components of hot runner assembly 100 of FIGS. 1-3. More particularly, one difference is that nozzle sleeve 404 of FIG. 4 has an integrally formed urging means 428. In this example, urging means 428 comprises a relatively thin outwardly and upwardly extending integral flange integral with nozzle sleeve 404. This integral flange may be likened to a Belleville washer fixedly secured to nozzle sleeve 404 at the inner periphery of washer and may be made, e.g., by a molding process or by milling. Urging means 428 may work in substantially the same manner as the Belleville washer Urging means 188 of FIGS. 1-3.

Another difference between the embodiment of FIG. 4 and the embodiment of FIGS. 1-3 is that nozzle sleeve 404 of FIG. 4 is secured to hot runner 408 using a plurality of washer-type retainers 424, which may be secured to the hot runner using any suitable means, such as the screws 432 shown. Retainers 424 may be any suitable shape, and each may engage a corresponding recess 436 within nozzle sleeve 404, if desired. If needed, the shape of each recess 436 may be made to conformally engage the corresponding retainer 424 so as to inhibit rotation of nozzle sleeve 404 about its central longitudinal axis 440.

Yet another difference between the embodiment of FIG. 4 and the embodiment of FIGS. 1-3 is that nozzle-receiving cavity 444 of mold 416 has a tapered section 448 that provides not only a tapered sealing surface 452 if a face-to-face seal is desired, but also a self-alignment means for ensuring that nozzle sleeve 404 and nozzle 420 are properly aligned with the sprue opening 456 into the mold cavity 460. Any one or more of these differing features may be used in any particular nozzle sleeve as desired to suit a particular design.

FIGS. 5 and 6 illustrate yet another embodiment of a molding apparatus 500 made in accordance with the present invention. Unlike molding apparatuses 100 and 400 of FIGS. 1-3 and 4, respectively, that each have a nozzle sleeve 120, 404 secured to a hot runner 104, 408, molding apparatus 500 of FIGS. 5 and 6 has a nozzle sleeve 504 secured to the mold 508, rather than the hot runner 512. As with nozzle sleeves 120, 404 discussed above, nozzle sleeve 504 may be secured to mold 508 in any suitable manner, such as the ring-type retainer 516 shown. As illustrated in FIG. 6, nozzle sleeve 504 includes one or more stops 520 that are springingly urged into engagement with retainer 516 when hot runner 512 (FIG. 5) is not present or is otherwise moved away from mold 508. Nozzle sleeve 504 may be urged into engagement with retainer 516 using any suitable urging means, such as an integral urging means shown and described above in connection with FIGS. 1-4, e.g., a cantilever-type spring as shown in FIG. 4 or a non-integral urging means, e.g., the Belleville washer spring of FIGS. 1-3. In the embodiment shown in FIGS. 5-6, the urging means is an integral spring 524 formed in a portion of nozzle sleeve 504 that allows that portion of the nozzle sleeve to flex. This flexing is best seen by comparing FIG. 6, wherein: 1) a generally toroidally shaped (in three dimensions) tip 528 is engaged with frusto-conical nozzle-sleeve-engaging surface 532 of nozzle-receiving cavity 536 near the upper end (relative to FIG. 6); 2) integral spring 524 has a relatively steep slope; and 3) nozzle-sealing opening 540 is larger than the outside diameter of nozzle 544, to FIG. 5, wherein: 1) tip 528 is much lower on nozzle-sleeve-engaging surface 532; 2) integral spring 524 has a shallower slope; and 3) tip 528 is compressed so that nozzle-seal opening 540 seals tightly against nozzle 544.

As can be readily imagined for the transition between the state of FIGS. 6 to the state of FIG. 5, as hot runner 512 (FIG. 5) presses down on nozzle sleeve 504, which initially projects above the surface 548 of mold 508 that confronts the hot runner as in FIG. 6, toroidally shaped tip 528 slides along tapered-sleeve-engaging surface 532, thereby causing integral spring 524 to flex to allow further movement of the sleeve and causing the tip to compress so as to tightly engage nozzle 544. It is noted that the amount of travel of nozzle sleeve 504, the amount of flexure of integral spring 524 and the extent of compression of toroidally shaped tip 528 are exaggerated in FIGS. 5 and 6 for the sake of illustration. However, those skilled in the art will readily appreciate that the seals affected by nozzle sleeve 504 of FIGS. 5 and 6 when hot runner 512 is fully engaged with mold 508 can be substantially the same as the seals affected by each of nozzle sleeve 120 of FIGS. 1-3 and nozzle sleeve 404 of FIG. 4. That is, nozzle sleeve 504 of FIGS. 5 and 6 provides a nozzle seal with nozzle 544 and a cavity seal with nozzle-receiving cavity 536. As can be readily seen in FIG. 6, when nozzle sleeve 504 is urged into engagement with retainer 516, nozzle-sealing opening 540 is larger than the outside circumference of nozzle 544 so that when hot runner 512 is moved away from mold 508, the nozzle can move freely out of the nozzle-seal opening and the rest of the nozzle sleeve.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A nozzle sleeve for surrounding a portion of an injection nozzle of a hot runner and extending at least partially into a nozzle-receiving cavity of a mold when the mold is engaged with the hot runner, wherein one of 1) the hot runner and 2) the mold includes a retainer for movingly retaining the nozzle sleeve, the nozzle sleeve comprising:

a body having a longitudinal central axis and including:
   a nozzle-sealing opening for sealingly engaging the injection nozzle during molding;
   a cavity-sealing region for sealingly engaging the nozzle-receiving cavity of the mold during molding; and
   a stop configured for:
      engaging the retainer when the mold is disengaged from the hot runner and when the nozzle sleeve is secured to the one of 1) the hot runner and 2) the mold; and
      being spaced from the retainer during molding.

2. The nozzle sleeve of claim 1, wherein the nozzle sleeve is configured to be secured to the mold by the retainer during use and said body has a hot-runner end and a mold end located distal from said hot-runner end, the mold end including an integral urging means urging said stop against the retainer when the nozzle sleeve is secured to the mold and the mold is not engaged with the hot runner.

3. The nozzle sleeve of claim 2, wherein said integral urging means defines said nozzle-sealing opening and said integral urging means is configured to create a compression seal with the injection nozzle when the mold is engaged with the hot runner.

4. The nozzle sleeve of claim 1, wherein the nozzle sleeve is configured to be secured to the hot runner by the retainer during use and said body has a hot-runner end and a mold end located distal from said hot-runner end, the hot runner end including an integral urging means urging said stop against the retainer when the nozzle sleeve is secured to the hot runner and the mold is not engaged with the hot runner.

5. The nozzle sleeve of claim 1, wherein the nozzle sleeve is configured to be secured to the hot runner by the retainer during use and said body has a hot-runner end and a mold end distal from said hot-runner end, the hot-runner end adapted for receiving a non-integral urging means for urging said stop against the retainer when the nozzle sleeve is secured to the hot runner and the mold is not engaged with the hot runner.

6. A hot runner for use with a mold having a nozzle-sleeve receiver, comprising:
   a mold-confronting face for confronting the mold;
   at least one nozzle proximate said mold-confronting face for delivering a molding material to the mold;
   a nozzle sleeve surrounding at least a portion of said at least one nozzle and including a nozzle-sealing opening receiving said at least one nozzle; and
   a nozzle-sleeve retainer movably securing said nozzle sleeve to the hot runner;
   wherein said nozzle sleeve is springingly biased into engagement with said nozzle-sleeve retainer when the mold is distal from the hot runner and said nozzle sleeve is springingly biased into sealing engagement with the nozzle-sleeve receiver when the mold is properly engaged with the hot runner.

7. The hot runner of claim 6, further comprising an urging means springingly urging said nozzle sleeve into engagement with said nozzle-sleeve retainer when the mold is distal from the hot runner and springingly urging said nozzle sleeve into sealing engagement with the nozzle-sleeve receiver when the mold is properly engaged with the hot runner.

8. The hot runner of claim 7, wherein said urging means is formed integrally with said nozzle sleeve.

9. The hot runner of claim 6, wherein said nozzle sleeve is configured to seal with said at least one nozzle as the mold is moved into proper engagement with the hot runner.

* * * * *